(12) United States Patent
Menge (10) Patent No.: US 9,707,710 B2
(45) Date of Patent: Jul. 18, 2017

(54) SCINTILLATOR STACK, DEVICE INCLUDING THE SCINTILLATOR STACK, AND METHOD FOR MAKING THE SCINTILLATOR STACK

(71) Applicant: SAINT-GOBAIN CERAMICS & PLASTICS, INC., Worcester, MA (US)

(72) Inventor: Peter R. Menge, Novelty, OH (US)

(73) Assignee: Saint-Gobain Ceramics and Plastics, Inc., Worcester, MA (US)

(*) Notice: Subject to any disclaimer, the term of this patent is extended or adjusted under 35 U.S.C. 154(b) by 9 days.

(21) Appl. No.: 14/634,393

(22) Filed: Feb. 27, 2015

(65) Prior Publication Data
US 2015/0241579 A1    Aug. 27, 2015

Related U.S. Application Data

(60) Provisional application No. 61/945,630, filed on Feb. 27, 2014.

(51) Int. Cl.
| | | |
|---|---|---|
| *G01T 3/06* | (2006.01) | |
| *B29C 47/06* | (2006.01) | |
| *G01V 5/00* | (2006.01) | |
| *B29C 47/56* | (2006.01) | |
| *B29C 47/00* | (2006.01) | |
| *B29C 47/70* | (2006.01) | |
| *B29K 101/12* | (2006.01) | |
| *B29K 509/00* | (2006.01) | |

(52) U.S. Cl.
CPC ........ *B29C 47/065* (2013.01); *B29C 47/0021* (2013.01); *B29C 47/56* (2013.01); *B29C 47/707* (2013.01); *G01V 5/0091* (2013.01); *B29K 2101/12* (2013.01); *B29K 2509/00* (2013.01)

(58) Field of Classification Search
CPC ................... G01T 3/06; G01T 1/203
USPC ................................... 250/390.11
See application file for complete search history.

(56) References Cited

U.S. PATENT DOCUMENTS

| | | |
|---|---|---|
| 3,565,985 A | 2/1971 | Schrenk et al. |
| 5,880,471 A | 3/1999 | Schelten et al. |
| 2005/0135535 A1 | 6/2005 | Wallace |
| 2005/0224719 A1 | 10/2005 | Polichar et al. |
| 2007/0228284 A1 | 10/2007 | Polichar et al. |
| 2008/0054181 A1 | 3/2008 | Kondo et al. |
| 2008/0083877 A1 | 4/2008 | Nomura et al. |

(Continued)

FOREIGN PATENT DOCUMENTS

WO        2013106127 A1        7/2013

OTHER PUBLICATIONS

The International Search Report and the Written Opinion received from the International Searching Authority (ISA/KR) for International Application No. PCT/US2015/018136 dated Jun. 12, 2015, 13 pages.

(Continued)

*Primary Examiner* — David J Makiya
*Assistant Examiner* — Kenneth J Malkowski
(74) *Attorney, Agent, or Firm* — Abel Law Group, LLP; Robert N. Young (57) ABSTRACT

A scintillator stack includes a light-transportation layer and a scintillator layer. The scintillator stack can be included in a scintillator device. The scintillator stack can be made using a co-extrusion method.

19 Claims, 5 Drawing Sheets

(56) References Cited

U.S. PATENT DOCUMENTS

| | | | |
|---|---|---|---|
| 2009/0045348 A1* | 2/2009 | Stuenkel | G01T 3/06 250/390.11 |
| 2009/0140150 A1 | 6/2009 | Ivan et al. | |
| 2010/0224783 A1* | 9/2010 | Frank | G01T 3/06 250/366 |
| 2010/0276602 A1 | 11/2010 | Clothier et al. | |
| 2011/0192981 A1 | 8/2011 | Menge et al. | |
| 2011/0233420 A1 | 9/2011 | Feller et al. | |
| 2011/0303852 A1* | 12/2011 | Menge | G01T 3/06 250/367 |
| 2013/0001423 A1 | 1/2013 | Jagannathan et al. | |
| 2013/0208857 A1 | 8/2013 | Arodzero et al. | |
| 2014/0027646 A1 | 1/2014 | Zaitseva et al. | |

OTHER PUBLICATIONS

Zaitseva et al., "Plastic scintillators with efficient neutron/gamma pulse shape discrimination," Lawrence Livermore National Laboratory, Livermore, CA, Nuclear Instruments and Methods in Physics Research A 668 (2012) 88-93, Elsevier, dated 2011, 6 pages.

Ponting et al., "Polymer Nanostructures by Forced Assembly: Process, Structure, and Properties," Macromol. Symp. 2010, 294-I, 19-32, DOI: 10.1002/masy.201050803, Wiley-VCH Verlag GmbH & Co. KGaA, Weinheim, wileyonlinedlibrary.com, dated 2010, 14 pages.

* cited by examiner

SCINTILLATOR STACK, DEVICE INCLUDING THE SCINTILLATOR STACK, AND METHOD FOR MAKING THE SCINTILLATOR STACK

CROSS-REFERENCE TO RELATED APPLICATION(S)

This application claims priority to and the benefit of U.S. Prov. Pat. App. No. 61/945,630 filed Feb. 27, 2014, and is incorporated herein by reference in its entirety.

FIELD OF THE DISCLOSURE

This disclosure relates to scintillator stacks, apparatuses including scintillator stacks, and methods for making scintillator stacks.

DESCRIPTION OF RELATED ART

Scintillator-based detectors are used in a variety of applications, including research in nuclear physics, oil exploration, field spectroscopy, container and baggage scanning, and medical diagnostics. When a scintillator material of the scintillator-based detector is exposed to ionizing radiation, the scintillator material absorbs energy of incoming radiation and scintillates, remitting the absorbed energy in the form of photons. For example, a neutron detector can emit photons after absorbing a neutron. Further improvements of scintillator-based detectors are desired.

BRIEF DESCRIPTION OF THE DRAWINGS

Embodiments are illustrated by way of example and are not limited by the accompanying figures.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "averaged," when referring to a parameter, is intended to mean a median value for the parameter.

The term "elemental" before an atomic element is intended to mean to the atomic form of the atomic element that is not part of a chemical compound. For example, elemental Zn refers to zinc in its atomic form and not as part of a zinc compound, such as ZnS.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The term "rare earth" or "rare earth element" is intended to mean Y, Sc, and the Lanthanoids (La to Lu) in the Periodic Table of the Elements.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillator stack can include a plurality of layers. The layers can include both a light-transportation layer and a scintillator layer. The scintillator layer can be a microlayer. A microlayer refers to a layer having a thickness of 1,000 microns or less. The light-transportation layer can have a refractive index that is greater than the scintillator layer and can include a transparent plastic layer. The scintillator layer can include a particulate material dispersed in a matrix material. The scintillator layer can include a neutron scintillator layer, a gamma ray scintillator layer, or any combination thereof. The scintillator stack can further include a neutron-sensitive layer.

The scintillator stack can include a plurality of alternated layers, such as a repeating set of layers. The term "set of layers" refers to a portion of the stack including one of each of the types of layers in the stack. For example, a set of layers can include one of the light-transportation layers and one of the scintillator layers, or a set of layers can include one of the light-transportation layers, one of the scintillator layers, and one of the neutron-sensitive layers. The repeating set of layers can include layers having the same length and width. In a particular embodiment, the scintillator stack can include a repeating set of layers including a light-transportation layer, a neutron scintillator layer, and a neutron-sensitive layer. In another particular embodiment, the scintillator stack can include a set of layers including a light-transportation layer and a pulse shape discrimination (PSD) layer. In yet another particular embodiment, the scintillator stack can include a set of layers including a light-transportation layer and a gamma ray scintillator layer.

The layers of the scintillator stack can be manufactured using a co-extrusion method, such as a forced polymeric micro-layer co-extrusion method, which can provide a scintillator stack with thousands of repeating layers.

In an embodiment, a radiation particle can enter the scintillator layer and be captured by a scintillator particulate material contained in the layer, which in turn, emits scintillation light. The scintillator stack can be used in a radiation-sensor or within a radiation-sensitive apparatus.

Conventional radiation sensors that include a thick scintillator layer can be inefficient because of energy loss due to the distance a particle must travel to exit the thickness of the layer. However, for the scintillator stack described herein, having the light transportation layer coextruded with a scintillator layer allows the light transportation layer to capture more of the scintillation light from the scintillator layer. Additionally, less energy is lost in the thinner scintillator layer and, when the scintillator stack includes a repeating set of alternating light transportation layers and scintillator layers, the scintillator stack can capture as much, or even more, radiation particles as compared to one or a few of the conventional thick scintillator layers.

In addition, the consistent repeating set of the scintillator stack described herein can make the energy deposition into the scintillator particulate material more uniform from one reaction to another. Potentially less scintillator material may be used in a radiation sensor and still achieve an acceptable light output. Alternatively, higher light output may be achieved for substantially the same amount of scintillator materials in a comparable conventional radiation sensor or radiation-sensitive apparatus.

Figure 1:
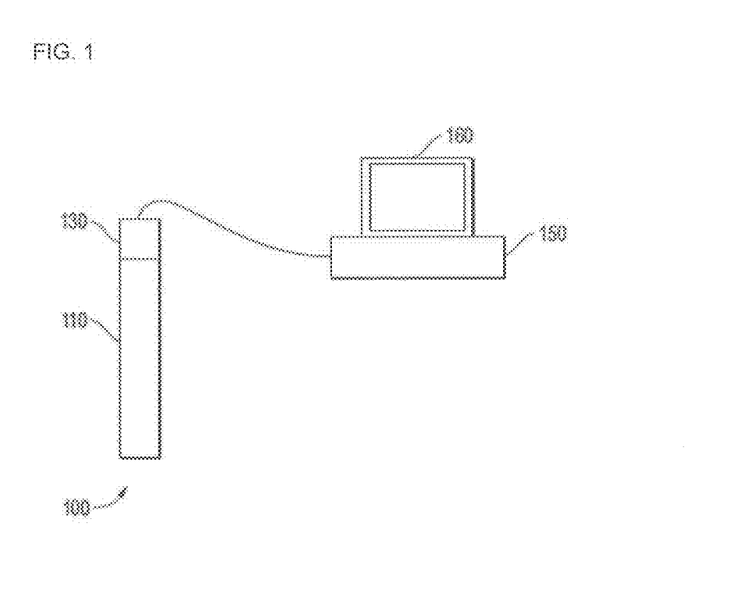
FIG. 1 is an illustration of a radiation-sensitive apparatus in accordance with an embodiment described herein.

The scintillator stack can be used in a radiation sensor 110 that is part of a radiation-sensitive apparatus 100, as illustrated in FIG. 1. The radiation sensor 110 is optically coupled to a photosensor 130 that includes a photomultiplier tube or a semiconductor-based photomultiplier. The photosensor 130 is electronically coupled to computational circuitry 150. The computational circuitry 150 can receive and analyze the pulse data from the photosensor 130 to determine a number of radiation particle counts, a level of radiation based on the identified number of radiation particle events, perform pulse shape discrimination, perform another suitable function, or the like.

Further, computational circuitry 150 can provide an indication of the number of radiation particle events, type of radiation particle events, an indication of a level of radiation, or provide other information to a user via an interface 160. For example, computational circuitry 150 can provide a visual display via interface 160 indicating a level of radiation. The operation of the neutron-sensitive apparatus 100 is described in more detail following a description of an exemplary, non-limiting embodiment of the radiation sensor 110.

Figure 2:
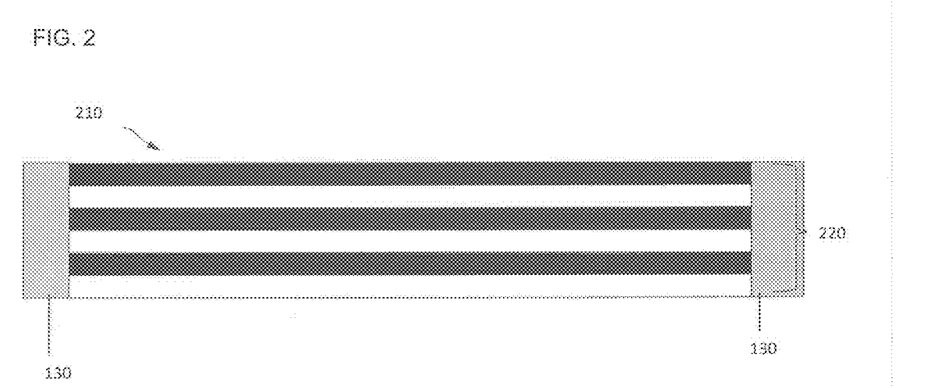
FIG. 2 is a cross-sectional view of a radiation sensor in accordance with an embodiment described herein.

FIG. 2 includes a cross-sectional view of the radiation sensor 210 that includes a scintillator stack 220, wherein the scintillator stack 220 includes at least one light-transportation layer and at least one scintillator layer. In another embodiment, the stack 220 can include more light-transportation layers and scintillator layers. The radiation sensor can further include the photosensor 130 disposed along an outer surface of the radiation sensor, such as a surface comprising multiple layers of the scintillator stack. If it is desired to detect neutron radiation, a neutron moderator (not illustrated) can be disposed along an outer surface of the scintillator stack 220, or the light-transportation layer can function as a neutron moderator. Optionally, an optical transmission member (not illustrated), a reflector (not illustrated), or both can be disposed along or optically connected to the scintillator stack 220.

In operation, radiation particles, such as neutrons or gamma rays, can be sensed at the scintillator stacks 220 of the radiation sensor 110 of the radiation-sensitive apparatus 100. For a neutron sensor, fast neutrons, if any, that enter the neutron sensor are converted to thermal neutrons by the neutron moderator (not illustrated), and thermal neutrons, if any, that enter the neutron sensor do not need to be converted to thermal neutrons by a neutron moderator and pass through the neutron moderator.

Embodiments of the scintillator stack can be configured such that a radiation-sensitive particulate material or radiation sensitive matrix material can capture the radiation particle (or secondary particle) for conversion into photons can be increased. Upon capture of the radiation particle (or secondary particle), a scintillator particulate material can emit scintillation light such as photons.

The scintillation light can leave the scintillator stacks 220 and be received by the photosensor 130 (illustrated in FIG. 1) or transmitted to the photosensor 130 via the optical transmission member (not illustrated). In another embodiment, the optical transmission member can convert the scintillation light to wavelength shifted light that is transmitted to the photosensor 130. Photons from the scintillation light or wavelength shifted light can be received by the photosensor 130, and the photosensor 130 generates an electronic pulse in response to receiving the photons. The electronic pulse is sent from the photosensor 130 and is received by the computational circuitry 150. The computational circuitry 150 can analyze or perform another function in response to receiving the electronic pulse from the photosensor 130. The computational circuitry can determine that a neutron has been captured and increment a neutron counter, determine a neutron radiation level, perform another suitable determination, analysis, or the like, or any combination thereof.

Particular designs for the neutron sensor 110 and neutron-sensitive apparatus 100 have been described. Other neutron sensors and neutron-sensitive apparatuses can be used with the scintillator stack 220. Thus, after reading this specification, skilled artisans will appreciate that the scintillator stack 220 can be implemented in many different radiation sensors and radiation-sensitive apparatuses without departing from the scope of the present invention.

Attention is now directed to embodiments of the scintillator stack that can be used in radiation sensors and radiation-sensitive apparatuses.

Figure 3:
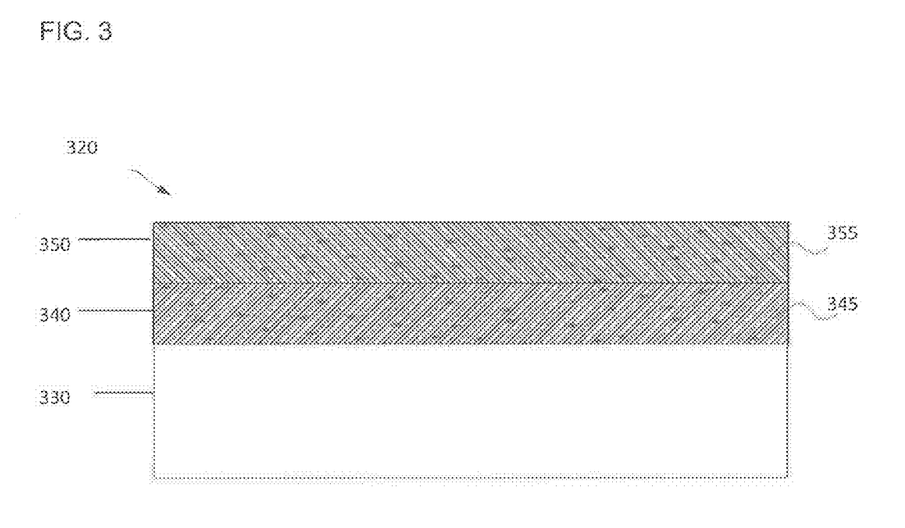
FIG. 3 is an illustration of a scintillator stack in accordance with an embodiment described herein.

FIG. 3 illustrates an embodiment of a scintillator stack 320 including a light-transportation layer 330, a scintillator layer 340, and a neutron-sensitive layer 350.

In an embodiment, the light-transportation layer 330 has a refractive index that is greater than the refractive index the scintillator layer.

The light-transportation layer 330 can include a polymer. The polymer can include a transparent polymer. In an embodiment, the polymer includes polystyrene (PS), a polyvinyl toluene, a polyethylene naphthalate (PEN), a polyethylene terephthalate (PET), or any combination thereof.

The light-transportation layer 330 should be thick enough to capture and transport scintillation light emitted from the scintillator layer 340. For example, the light-transportation layer 330 can have a thickness of at least 0.09 micron, at least 0.3 micron, at least 0.5 microns, at least 0.7 microns, or at least 0.9 microns. Although the thickness of the light-transportation layer 330 could be increased, the light-transportation layer may have of no greater than 135 microns, no greater than 115 microns, or no greater than 95 microns, no greater than 75 microns, no greater than 55 microns, no greater than 35 microns, or no greater than 15 microns. In yet another embodiment, the light-transportation layer has a thickness of 3 to 135 microns, 5 to 95 microns, or 7 to 15 microns.

The light-transportation layer 330 can include a light guide, a wavelength shifter, a neutron moderator, or any combination thereof. The thickness of the light-transportation layer 330 may be increased to no greater than 1 cm, 5 cm or 10 cm to function as a neutron moderator.

The scintillator layer 340 can include a scintillator particulate material 345. The scintillator particulate material 345 can include an inorganic scintillator compound, an organic scintillator compound, or any combination thereof, that produces photons in response to capturing a secondary particle. In an embodiment, the scintillator particulate material 345 may have a relatively low sensitivity to gamma radiation.

Utilizing only elements having a low atomic number, such as below 50, even below 40, can reduce the sensitivity of the scintillator stack to gamma rays. For example, the scintillator particulate material 345 can incorporate an inorganic substance such as a ZnS, a CdS, a ZnCdS, a ZnO, a MgS, a CaS, a SrS, a BaS, a yttrium aluminum garnet (YAG, $Y_3Al_5O_{12}$), a yttrium aluminum perovskite ($Y_{(2-2x)}Al_xO_3$), a $MgF_2$, a $CaF_2$, a CsF, a $SrF_2$, a $BaF_2$, a rare earth oxyorthosilicate, a $CaWO_4$, any combination thereof, or another inorganic substance to produce scintillation light in response to capturing a secondary particle. In a particular embodiment, the scintillator particulate material 345 includes ZnS. An example of an organic scintillator compound includes anthracene, a scintillator plastic, or another organic substance to produce scintillation light in response to capturing a secondary particle. Additionally, the scintillator particulate material 345 can include a dopant or another added impurity, such as a transition metal, a rare earth metal, or another metal. For example, the scintillator layer can include ZnS:Ag, ZnS:Cu, $Y_2SiO_5$:Ce, ZnO:Ga, or ZnCdS: Cu. In a particular embodiment, the scintillator layer includes ZnS:Ag. In another particular embodiment, the scintillator particulate material 345 includes ZnS:Cu.

The scintillator particulate material 345 can include a variety of shapes, including spherical particulate material and non-spherical particulate material, and a variety of averaged particulate material sizes. The scintillator particulate material 345 has an averaged particle size so that neutrons can be captured. In an embodiment, the scintillator particulate material 345 has an averaged particle size of at least 1 micron, at least 5 microns, at least 15 microns, or at least 25 microns. Still, the averaged particle size of the scintillator particulate material 345 should be relatively small to maintain a thin layer to shorten the distance the scintillation light travels to exit the scintillation layer. In another embodiment, the scintillator particulate material 345 has an averaged particle size of no greater than 75 microns, no greater than 55 microns, no greater than 45 microns, or no greater than 35 microns. In a particular embodiment, the scintillator particulate material 345 has an averaged particle size of 5 to 75 microns, 15 to 55 microns, or 25 to 35 microns. For the measurements described herein, the averaged particle size of spherical particulate material is measured using the diameter of the particulate material, and the averaged particle size of non-spherical particulate material is measured using a width of the particle.

The scintillator particulate material 345 can be dispersed in a matrix material to provide the scintillator layer 340. In an embodiment, the matrix material can be a polymer matrix including a transparent polymer. In an embodiment, the polymer can include an epoxy, a polyvinyl toluene (PVT), a polystyrene (PS), a polymethylmethacrylate (PMMA), a polyvinylcarbazole (PVK), a polybutyrate (such as cellulose acetate butyrate), a polycarbonate, a polyurethane, a glycol modified polyethylene terphthalate (PETG), or any combination thereof. Commercially available polycarbonates include those sold by SABIC Innovative Plastics (Pittsfield, Mass.) under the trade name LEXAN™.

The loading of the scintillator particulate material 345 in the polymer matrix of the scintillator layer 340 should be sufficient provide enough scintillator particulate material 345 to capture a high amount of the energy of charged particles emitted from the neutron-sensitive material. However, the scintillator stack described herein can be made according to a co-extrusion process discussed below and too much filler make the polymer too thick for extrusion. Thus, the loading of scintillator layer 340 should be sufficient to allow proper flow during the extrusion process.

The loading of the scintillator layer 340 can be represented by a ratio by weight of scintillator particulate material:polymer in the scintillator layer 340. In an embodiment, the ratio is at least 0.85:1, at least 0.90:1, or at least 0.95:1. In another embodiment, the ratio is no greater than 1.25:1, no greater than 1.15:1, or no greater than 1.05:1. In yet another embodiment, the ratio is from 0.85:1 to 1.24:1, from 0.90:1 to 1.15:1, or from 0.95:1 to 1.05:1.

The loading of a particulate material in a layer can be represented by a filling fraction, which is the concentration by volume of particulate material in a layer. In an embodiment, the filling fraction for the scintillator layer 340 can be at least 5%, at least 15%, or at least 25%. In another embodiment, the filling fraction may be no greater than 55%, no greater than 50%, or no greater than 45%. In yet another embodiment, the filling fraction can be 5% to 55%, 15% to 50%, or 25% to 50%. A filling fraction above 50% may begin to deteriorate the structural stability of the layer or inhibit the flow of the material during extrusion.

The scintillator layer 340 can have a thickness sufficient to contain the scintillator particulate material. In an embodiment, the scintillator layer 340 can have a thickness of at least 5 microns, at least 15 microns, or at least 25 microns. The scintillator layer 340 should be thin enough to allow the scintillation light emitted from the scintillator particulate material to pass through to the scintillator layer 340 without significant energy loss. In a further embodiment, the scintillator layer 340 may have a thickness of no greater than 100 microns, no greater than 85 microns, no greater than 55 microns, no greater than 45 microns, or no greater than 35 microns. In a particular embodiment, the scintillator layer 340 can have a thickness of 5 to 100 microns, 15 to 55 microns, or 25 to 45 microns. When the scintillator stack 320 includes multiple scintillator layers 340, the averaged thickness of the scintillator layers 340 in the scintillator stack 320 can include the above ranges.

The neutron-sensitive layer 350 can include a neutron-sensitive particulate material 355. The neutron-sensitive particulate material 355 can emit a charged particle, such as a positively charged particle, in response to absorbing a neutron. The positively charged particle can include an alpha particle, a triton particle, a protron, a $^7$Li particle, a fission particle, or any combination thereof.

In an embodiment, the neutron-sensitive particulate material 355 can include neutron responsive atoms such as $^6$Li or $^{10}$B. For example, the neutron-sensitive particulate material 355 can include a neutron responsive element that is in elemental form (not part of a compound) or as part of a halide compound, a phosphate compound, a silicate compound, or any combination thereof. In a particular embodiment, the neutron-sensitive particle can include $^6$LiF, $^6$Li$_3$PO$_4$, $^6$Li$_4$SiO$_4$, elemental $^{10}$B, $^{10}$BN, a $^{10}$B oxide, $^{10}$B$_4$C, or any combination thereof. In a more particular embodiment, neutron-sensitive particulate material 355 includes $^6$LiF.

The neutron-sensitive particulate material 355 can include a variety of shapes, including spherical particulate material and non-spherical particulate material, and a variety of averaged particulate material sizes. The neutron-sensitive particulate material 355 can have an averaged particle size such that neutrons can be captured. In an embodiment, the neutron-sensitive particulate material 355 has an averaged particle size of at least 0.2 microns, at least 0.5 microns, at least 0.9, at least 2 microns, or at least 3 microns. Still, the averaged particle size of the neutron-sensitive particulate material 355 should be relatively small to reduce energy lost by the secondary particulate material as it travels from the point of origin to another point outside of the neutron-sensitive layer. In another embodiment, the neutron-sensitive particulate material 355 has an averaged particle size of no greater than approximately 25 microns, no greater than 15 microns, no greater than 9 microns, or no greater than 7 microns. In a particular embodiment, the neutron-sensitive particulate material 355 has an averaged particle size of 0.2 to 25 microns, 0.5 to 15 microns, or 0.5 to 7 microns. The averaged particle size of spherical neutron-sensitive particulate material 355 is measured using the diameter of the particulate material. The averaged particle size of non-spherical neutron-sensitive particulate material 355 is measured using any other suitable dimensions, such as a length, a width, or a cube root of the volume of the particle.

The neutron-sensitive particulate material 355 can be dispersed in a matrix material to provide the neutron-sensitive layer. In an embodiment, the matrix material can be a polymer matrix including a transparent polymer. In an embodiment, the polymer can include an epoxy, a polyvinyl toluene (PVT), a polystyrene (PS), a polymethylmethacrylate (PMMA), a polyvinylcarbazole (PVK), a polybutyrate (such as cellulose acetate butyrate), a polycarbonate, a polyurethane, a glycol modified polyethylene terphthalate (PETG), or any combination thereof. Commercially available polycarbonates include those sold by SABIC Innovative Plastics (Pittsfield, Mass.) under the trade name LEXAN™.

The loading of the neutron-sensitive particulate material 355 in the polymer matrix of the neutron-sensitive layer 350 should be sufficient to provide enough neutron-sensitive particulate material to capture a high amount of neutrons. However, the loading should be sufficient to allow the emitted charged particulate material to exit the neutron-sensitive layer 350. In an embodiment, the loading of the neutron-sensitive layer 350 can be represented by the same ranges for the above ratio by weight or filling fraction by volume of the scintillator layer 340.

The neutron-sensitive layer 350 can have a thickness sufficient to contain the neutron-sensitive particulate material 355. In an embodiment, the neutron-sensitive layer 350 can have a thickness of at least 1 micron, at least 2 microns, at least 3 microns, at least 4 microns, or at least 5 microns. The neutron-sensitive layer 350 should be thin enough to allow the charged particulate material emitted from the neutron-sensitive particulate material 355 to pass through to the scintillator layer 340 without significant energy loss. In a further embodiment, the neutron-sensitive layer 350 may have a thickness of no greater than 100 microns, no greater than 50 microns, no greater than 25 microns, no greater than 15 microns, or no greater than 9 microns. In a particular embodiment, the neutron-sensitive layer 350 can have a thickness of 1 to 100 microns, 3 to 25 microns, 3 to 15 microns, or 3 to 9 microns. When the neutron-sensitive layer 350 includes multiple layers, the averaged thickness of the neutron-sensitive layers 350 can include the above ranges.

The polymer of the scintillator can include one or more of any of the polymers used for the neutron-sensitive layer. The polymer matrix of the neutron-sensitive layer can be made from the same or different material as compared to the polymer matrix of the scintillator layer. In a particular embodiment, polymer matrix of the neutron-sensitive layer is made from a material that is different than the material used to make the polymer matrix of the scintillator layer.

In an embodiment, the neutron-sensitive layer 350 does not include scintillator particulate material, such as the scintillator particulate material 345. Similarly, in an embodiment, the scintillator layer 340 does not include the neutron-sensitive particulate material 355.

Embodiments of the scintillator stack 320 obviate issues that occur with neutron sensors and neutron-sensitive apparatuses that have the neutron-sensitive particulate material dispersed in the same matrix as the scintillator particulate material as seen with conventional neutron sensors. Optimal sizes for each of the neutron-sensitive particulate material and the scintillator particulate material can be very different. Thus, in conventional neutron sensors, there is a risk that the neutron-sensitive particulate material and scintillator particulate material may segregate before the particulate material is thoroughly mixed within a matrix material leading to poor light output. One of the problems with such a segregated mixture is that its non-uniformity leads to a distribution in energy straggling that blurs the energy resolution and lowers detection efficiency. The energy carried away by charged particles can be deposited among the neutron-sensitive particulate material, the scintillator particulate material, and the polymer binder which varies from reaction to reaction due to the non-uniformity. The result is a wide distribution in the neutron energy spectrum as measured by the amount of scintillation light. However, for the scintillator stack 320, the neutron-sensitive particulate material 355 can be separated from the scintillator particulate material 345 in an adjacent thin layers to avoid segregation within the same matrix. This structure can overcome the above deficiency in conventional neutron sensors because a consistent repeating set can make the energy deposition into the scintillator particulate material 345 more uniform from one reaction to another.

Figure 4:
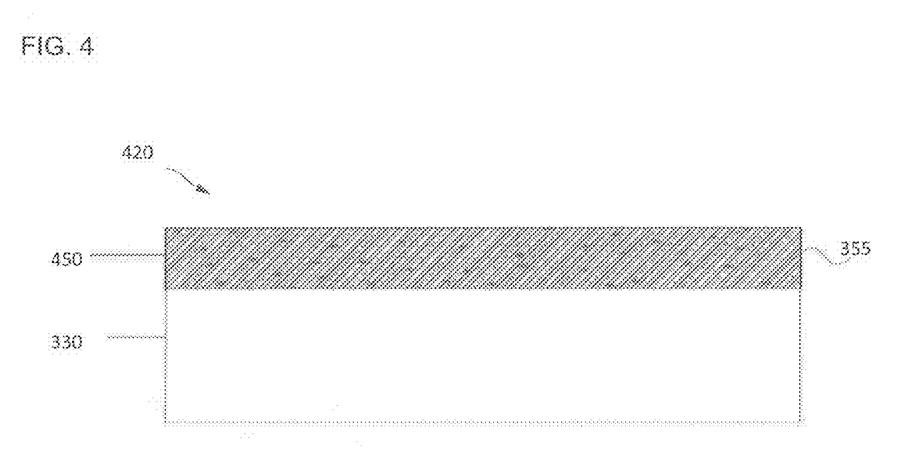
FIG. 4 is an illustration of another scintillator stack in accordance with an embodiment described herein.

FIG. 4 illustrates an embodiment of a scintillator stack 420 including the light-transportation layer 330 (as described above) and a PSD layer 450.

The PSD layer 450 can include all of the characteristics of neutron-sensitive layer 350 described above, except that the neutron-sensitive particulate material 355 is dispersed in a PSD polymer instead of including a separate scintillator layer. A PSD polymer is a scintillating plastic that can aid in distinguishing neutron luminescence from a preponderance of luminescence arising from background gamma interactions. In an embodiment, the PSD polymer can include a polyvinyltoluene (PVT), a PS, a polyvinyl xylene (PVX), a polymethyl, a 2,4-dimethyl, a 2,4,5-trimethyl styrenes, a polyvinyl diphenyl, polyvinyl naphthalene, a polyvinyl tetrahydronaphthalene. In a further embodiment, the PSD polymer can include a fluorescent dye. In an embodiment, the PSD polymer can be doped with a dopant at a density of 100 grams/liter (g/L) to 500 g/L, from 150 g/L to 450 g/L.

Generally, a high loading of neutron-sensitive particulate material in a PSD polymer can limit the benefits of using the PSD polymer. In particular, high loadings can cause a haze in the PSD plastic and obstruct the scintillation light from exiting the PSD layer. However, due to the co-extrusion methods described herein, the scintillator stack 420 can include several thin PSD layers 450 alternated with the light-transportation layer 330. With this repeating set, a higher loading is possible and haze is less problematic because the light does not have as much distance to travel in a thinner PSD layer 450 and the layers 450 can be surrounded by light-transportation layers 430 that can capture more of the scintillation light exiting the layers 450. A thicker, or more efficient overall detector can be possible by using more layers, because photon pathlengths through the particulate layers and through the PSD polymer layers will always be low. Additionally, better pulse-shape discrimination can be maintained because the photon pathlength dispersion can be lower. In other words, the "shape" of the pulse will be less changed than propagation through a highly loaded polymer or a thick PSD polymer.

Figure 5:
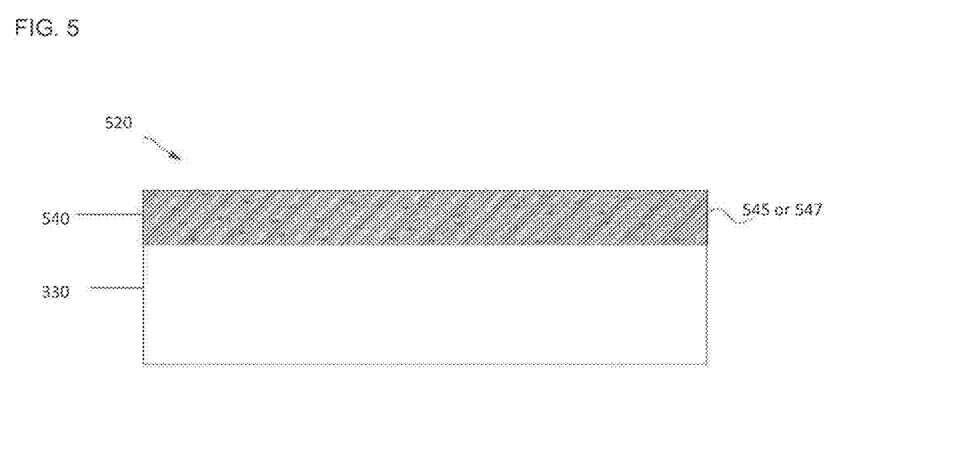
FIG. 5 is an illustration of yet another scintillator stack in accordance with an embodiment described herein.

FIG. 5 illustrates an embodiment of a scintillator stack 520 including the light-transportation layer 330 (as described above) and a scintillator layer 540.

The scintillator layer 540 can include a scintillator particulate material 545 dispersed in a non-scintillator matrix material or a non-scintillator filler particulate material 547 dispersed in a scintillator matrix material.

The scintillator particulate material 545 can include a scintillator particulate material that is sensitive to gamma rays. For example, the scintillator particulate material 545 can include materials having a high atomic number, such as greater than 40 or greater than 50. In an embodiment, the scintillator particulate material 545 can include sodium iodide (NaI), cerium bromide ($CeBr_3$) crystal, bismuth germinate (BGO) crystals, or any combination thereof.

The scintillator particulate material 545 can include the same shapes and sizes described above with respect to scintillator particulate material 345.

As stated previously, the scintillator particulate material 545 can be dispersed in a non-scintillating matrix material. The non-scintillating matrix material can include the polymer matrix materials described above with respect to the scintillator particulate material 345.

Embodiments of the non-scintillating filler particulate material 547 dispersed in a scintillator matrix material. The filler particulate material 547 can include a non-scintillating material having an atomic number of at least 50, at least 60, or at least 70. For example, the filler particulate material 547 can include lead (Pb), bismuth (Bi), or a combination thereof.

As stated previously, the filler particulate material 547 can be dispersed in a scintillator matrix material. The scintillator matrix material can include a polymer matrix material including a polymer sensitive to gamma rays. The polymer sensitive to gamma rays can include a PS doped with 2,5-diphenyloxazole and 4,4-bis-(2-butyloctyloxy)-p-quaterphenyl; a PVT doped with p-terphenyl and bis-(2-methylstyryl)benzene (bis-MSB); a transparent polymer doped with naphthalene; 1,1,4,4-tetraphenyl-1,3 butadiene (TPB); or any combination thereof. The polymer may be doped with dopant at a density of 25 g/L to 100 g/L or from 35 g/L to 75 g/L.

The loading and thickness of the scintillator layer 540 can include the loading and thickness parameters described above with respect to scintillator layer 340. In a further embodiment, the thickness of the scintillator layer can be from 0.1 micron to 10 microns or from 0.5 microns to 3 microns.

The total thickness of any of the embodiments of the scintillator stack described herein can be at least 0.05 mm, at least 0.1 mm, at least 0.15 mm, at least 0.25 mm, or at least 1 mm, or at least 2 mm. The scintillator stack should be thin enough to allow the scintillation light to propagate through the layers. Thus, embodiments of the scintillator stack may have a total thickness of no greater than 20 mm, no greater than 14 mm, no greater than 9 mm, no greater than 5 mm, no greater than 3 mm, no greater than 1 mm, or no greater than 0.75 mm. In a particular embodiment, the scintillator stack can have a total thickness of 0.05 to 20 mm, 0.1 to 15 mm, or 2 to 9 mm.

In general, the thickness of the scintillator stack is dependent on the number of layers in the stack. As stated previously, the scintillator stack can include a repeating set of layers. The scintillator stack can include $2^{x+1}$ repeating sets of layers, where x can be zero or a positive integer up to 100. For example, x can be a positive integer of at least 1, at least 3, or at least 5. Although there is no theoretical limit on the number of layers in the scintillator stack, x may be a positive integer of no greater 15, no greater than 13, or no greater than 11. In an embodiment, x can be a positive integer of from 1 to 15, 3 to 13, or 5 to 11. In a particular example, the number of sets of layers in a scintillator stack can be from 500 to 10,000, or from 1,000 to 5,000.

Embodiments of the scintillator stack described herein can be manufactured using a co-extrusion method, such as a forced assembly multilayer co-extrusion method. Forced assembly multilayer co-extrusion includes co-extrusion of a plurality of polymers in a layered feed-block and additional layer multiplication accomplished through a series of multiplier dies. The multilayer co-extrusion method can create thousands of alternating layers of different polymers. Layer thicknesses can be approximately a few tens of nanometers.

Figure 6:
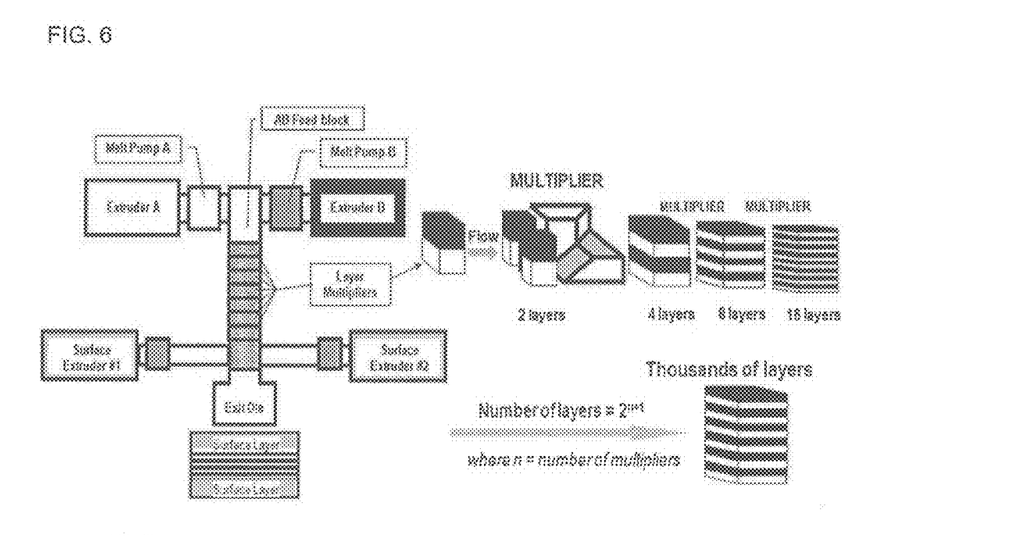
FIG. 6 is a schematic of a co-extrusion method in accordance with an embodiment described herein.
Figure 7:
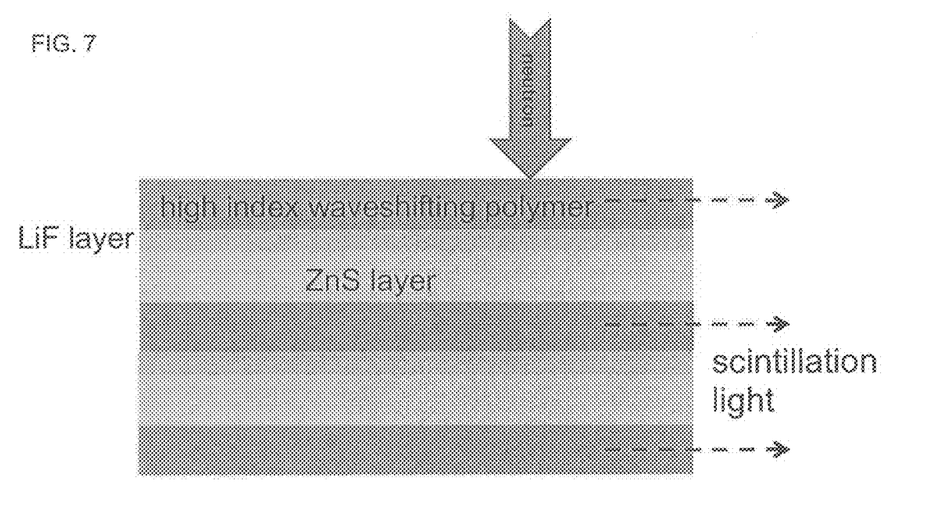
FIG. 7 includes an illustration of a co-extruded light guide in accordance with an embodiment described herein.

FIG. 6 includes a schematic of an embodiment of the method. The method can include providing an extrudable neutron-sensitive material into Extruder A and providing an extrudable scintillator material into Extruder B. The extrudable materials are heated and fed through Melt Pump A or B into the AB feed block. The heated extrudable materials can be subjected to one or more multiplier extrusions dies to create the desired structure. For example, the two layer structure can be cut in half, softened, and pressed to form a 4-layer structure, and then an 8-layer structure, and then a 16-layer structure, and so on. The number of layers formed can be equal to $2^{x+1}$, where x is the number of multipliers. Once the desired number of layers have been formed, Surface Extruder #1 and Surface Extruder #2 apply a surface layer to the first and last layer of the multilayer stack. The multilayer stack exits the extruder through the Exit Die. A third extruder, Extruder C (not illustrated), can be added to the method to create three different material layers, and so on. FIG. 7 includes an illustration of a representative cross-section of a multilayer stack made according to the method described above.

Certain existing methods of making a light guide include forming a large film comprising a mixture of LiF and ZnS(Ag) powder and placing a layer of wave shifting optical fiber on opposite sides of the large film. The thickness of the large film can be no less than 0.5 mm to provide proper mechanical support. When scintillation light emitted from the ZnS(Ag) enters the wave shifting optical fiber, the light shifts to a longer wavelength (e.g., blue to green). The wave shifted light can be re-emitted within the fiber in random directions and some fraction of the re-emitted light can become trapped in the fiber due to total internal reflection. The trapped light is what is available for detection at the end of the wave shifting optical fibers by a photosensor such as a photomultiplier tube (PMT). However, a significant portion of the scintillation light emitted from the ZnS(Ag) may not arrive at the wave shifting optical fiber due to the thickness of the large film and the distance the scintillation light might travel before reaching the wave shifting optical fiber. In view of the above, the existing large films can result in significant light attenuation.

Figure 8:
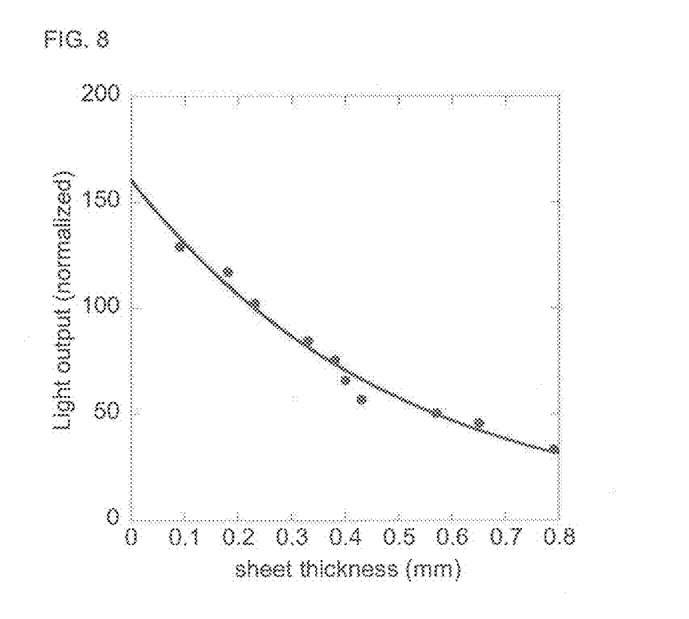
FIG. 8 includes a graph describing the typical absorption length of an LiF/ZnS(Ag) film.

On the other hand, certain embodiments of the multilayer stack according to the present disclosure can include alternating layers including a scintillator layer and a light transportation layer. Such a configuration can provide certain advantages. For example, it is a particular advantage of certain embodiments of the multilayer stack to have thinner individual scintillator layers, as they can be stacked to provide proper mechanical support. FIG. 8 includes a graph describing the typical absorption an LiF/ZnS(Ag) film. The curve in the graph of FIG. 8 shows an absorption length (also referred to as a "mean free path") of about 0.5 mm Therefore, it is desired to create a layer thickness for an LiF/ZnS(Ag) layer is significantly thinner than 0.5 mm, which can be accomplished by the co-extrusion process of the present disclosure.

It is another particular advantage of certain embodiments of the multilayer stack to have increased brightness, or reduced light attenuation, as compared to existing light guides. Without being bound by theory, the reduced light attenuation can be achieved in part by the multilayer structure and thinner individual layers, which can reduce the distance scintillation light is required to travel to reach a light transportation layer. In certain embodiments, the multilayer stack can have a percent trapped light of greater than 13%, such as at least 13.3%, or at least 13.5%, or even at least 13.7%. In further embodiments, the multilayer stack may have a percent trapped light of no greater than 30%, no greater than 25%, or no greater than 20%. In particular embodiments, the multilayer stack can have a percent trapped light in a range of greater than 13% to 30%, 13.3% to 25%, or 13.7% to 20%. The percent of scintillation light trapped can be determined according to the simulation described below. Further, in certain embodiments, the multilayer stack can have a brightness product, which is the product of total film thickness of the multilayer stack and percent of scintillation light trapped. The total film thickness as used for the brightness product does not include the thickness of the light transportation layers. The percent of scintillation light trapped can be determined according to the simulation described below. In certain embodiments, the multilayer stack can have a brightness product of at least 3.8, at least 4, or even at least 5. Further, as the total film thickness of the multilayer stack increases, the brightness product of the multilayer stack can increase. For example, the multilayer stack can have a thickness of at least 0.4 mm and a brightness product of at least 7, at least 9, at least 11, or even at least 13. In further embodiments, the multilayer stack may have a brightness product of no greater than 30, no greater than 25, or even no greater than 20. In particular embodiments, the multilayer stack can have a brightness product in a range of 3.8 to 30, 7 to 25, or even 13 to 20.

A simulation was performed to compare the fraction of scintillation light detected by existing lightguides as compared to certain embodiments of the multilayer stack described herein. As the existing lightguide, the simulation tested a monolithic LiF/ZnS(Ag) film. For a direct comparison, as the embodiment of the multilayer stack of the present disclosure, the simulation tested a co-extruded multilayer stack having alternating layers of LiF, ZnS(Ag), and a lightguide, including 15 layers each of LiF, ZnS(Ag), and the lightguide. The simulation included varying thicknesses for each product as provided below in Table 1. The simulation was performed using the optical simulation software, DETECT2000, and the fraction of generated scintillation light that becomes trapped in the wave shifting fibers or in the wave shifting extruded layers is the relevant quantity for comparison. DETECT2000 uses the Monte Carlo method to calculate the optical properties of systems. Optical parameters such as refractive index, absorption length, scattering length, and surface roughness are input for each material. Individual photons are generated in the ZnS(Ag) material, launched, and tracked until they are absorbed, trapped via total internal reflection, or escape the system.

Figure 9:
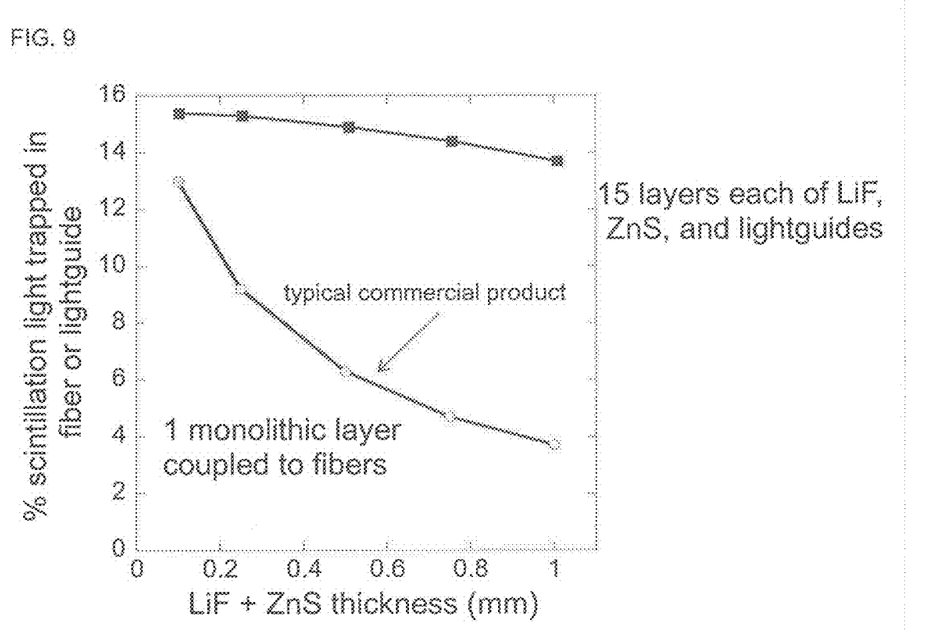
FIG. 9 includes a graph characterizing an optical simulation performed on the co-extruded light guide illustrated in FIG. 7.

The results of the simulation are also provided below in Table 1 and FIG. 9 includes a plot comparing the results. Table 1 and FIG. 9 illustrate the surprising result that the material with co-extruded light guides is brighter (or traps more light) even though both methods contain the same amount of LiF and ZnS(Ag). In fact, it appears that a multilayer stack according to the present disclosure can, in certain embodiments, propagate more than twice the light to a waiting photosensor as compared to existing products. It is believed that this surprising result may be achieved at least in part because photon pathlengths from the ZnS(Ag) to the nearest wave shifting lightguide are shorter than existing products.

TABLE 1

| Tthickness of monolithic film (mm) | % of scintillation light trapped in the fibers | Total thickness of the extruded LiF/ZnS layers | % of scintillation light trapped in the co-extruded light-guides |
|---|---|---|---|
| 0.1 | 13 | 0.1 | 15.4 |
| 0.25 | 9.2 | 0.25 | 15.3 |
| 0.5 | 6.3 | 0.5 | 14.9 |
| 0.75 | 4.7 | 0.75 | 14.4 |
| 1 | 3.7 | 1 | 13.7 |

The present invention has several advantages. The scintillator particulate material can be uniformly separated from the neutron-sensitive material into a repeating set which will make the energy deposition into the scintillator particulate material more uniform from one reaction to another. This uniformity can increase the efficiency of the neutron sensor in detecting secondary particles and yielding scintillation light. In addition, the repeating set can include several thin layers. Thus, the secondary charged particles do not need to travel through a thick polymer matrix in order to interact with the scintillator particulate material, which can eliminate more of the energy loss of the secondary charged particles in the polymer matrix.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below. Embodiments may be in accordance with any one or more of the items as listed below.

Item 1. A scintillator stack comprising:
a scintillator layer; and
a light-transportation layer;
wherein the scintillator layer has a thickness of less than 100 microns.

Item 2. A scintillator device comprising:
a photosensor; and
a scintillator stack optically connected to the photosensor, the stack comprising:
a scintillator layer; and
a light-transportation layer,
wherein the scintillator layer has a thickness of less than 100 microns.

Item 3. A method of making a scintillator stack, the method comprising:
providing an extrudable scintillator material;
providing an extrudable light-transportation material;
co-extruding a scintillator stack comprising:
a scintillator layer including the scintillator material; and
a light-transportation layer including the light-transportation material,
wherein the scintillator layer has a thickness of less than 100 microns.

Item 4. The method of item 3, wherein co-extruding includes forced polymeric micro-layer co-extrusion.

Item 5. The stack, device, or method of any one of the preceding items, wherein the stack comprises alternating layers including the scintillator layer and the light-transportation layer.

Item 6. The stack, device, or method of any one of the preceding items, wherein the scintillator layer is a neutron-sensitive layer.

Item 7. The stack, device, or method of any one of items 1-5, wherein the scintillator layer is a gamma ray-sensitive layer.

Item 8. The stack, device, or method of any one of items 1-5, wherein the stack includes a neutron-sensitive layer in addition to the scintillator layer and the light-transportation layer.

Item 9. The stack, device, or method of item 8, wherein the stack includes alternating layers including the scintillator layer, the light-transportation layer, and the neutron-sensitive layer.

Item 10. The stack, device, or method of item 6, wherein the neutron-sensitive layer includes a neutron-sensitive particulate material dispersed in pulse shape discriminating (PSD) polymer.

Item 11. The stack, device, or method of item 10, wherein the PSD polymer includes a polyvinyltoluene (PVT), a polystyrene (PS), a polyvinyl xylene (PVX), a polymethyl, a 2,4-dimethyl, a 2,4,5-trimethyl styrenes, a polyvinyl diphenyl, polyvinyl naphthalene, a polyvinyl tetrahydronaphthalene.

Item 12. The stack, device, or method of items 10 or 11, wherein the neutron-sensitive layer further includes a fluorescent dye.

Item 13. The stack, device, or method of item 6, wherein the neutron-sensitive layer includes a neutron-sensitive particulate material dispersed in a polymer matrix, the polymer including a transparent polymer.

Item 14. The stack, device, or method of items 6 or 13, wherein the neutron-sensitive layer includes a neutron-sensitive particulate material dispersed in a polymer matrix, the polymer matrix including a PVT, a PS, a PMMA, an epoxy, a polyvinylcarbazole (PVK), a polybutyrate (such as cellulose acetate butyrate), a polycarbonate, a polyurethane, a glycol modified polyethylene terphthalate (PETG), or any combination thereof.

Item 15. The stack, device, or method of item 6 or 8-14, wherein neutron-sensitive material includes a neutron-sensitive particulate material that emits a charged particle in response to absorbing a neutron.

Item 16. The stack, device, or method of item 15, wherein the neutron-sensitive particulate material is sensitive to thermal neutrons.

Item 17. The stack, device, or method of items 15 or 16, wherein the neutron-sensitive particulate material emits a positively charged particle in response to absorbing a neutron.

Item 18. The stack, device, or method of any one of items 15-17, wherein the positively charged particle includes an alpha particle, a triton particle, a deuteron particle, or any combination thereof.

Item 19. The stack, device, or method of any one of items 15-18, wherein the neutron-sensitive particulate material includes a compound containing a neutron-responsive element selected from the group consisting of $^6$Li, $^{10}$B, or any combination thereof.

Item 20. The stack, device, or method of item 19, wherein the neutron-responsive element includes $^6$Li.

Item 21. The stack, device, or method of item 19, wherein the neutron-responsive compound includes $^6$LiF.

Item 22. The stack, device, or method of items 8 or 9, wherein the scintillator layer includes a scintillator particulate material dispersed in a polymer matrix.

Item 23. The stack, device, or method of any one of items 8, 9, or 22, wherein the scintillator layer includes an inorganic scintillator particulate material.

Item 24. The stack, device, or method of any one of items 8, 9, 22, or 23, wherein the scintillator layer includes an inorganic scintillator particulate material including a ZnS, a ZnO, a ZnCdS, a CdS, a CaS, a BaS, a SrS, a MgS, a MgF$_2$, a CaF$_2$, a CsF, a SrF$_2$, a BaF$_2$, a Y$_3$Al$_5$O$_{12}$, a YAlO$_3$, a Gd$_2$SiO$_5$, a CaWO$_4$, a rare earth oxyorthosilicate, or any combination thereof.

Item 25. The stack, device, or method of any one of items 8, 9, 22, or 23, wherein the scintillator layer includes an inorganic scintillator particulate material including ZnS.

Item 26. The stack, device, or method of any one of items 8, 9, 22, or 23, wherein the scintillator layer does not include a neutron-sensitive material.

Item 27. The stack, device, or method of item 7, wherein the gamma ray-sensitive layer includes a particulate material dispersed in a polymer matrix.

Item 28. The stack, device, or method of item 27, wherein the particulate material is sensitive to gamma rays.

Item 29. The stack, device, or method of item 27 or 28, wherein the particulate material includes NaI, CeBr$_3$, bismuth germinate (BGO), or any combination thereof.

Item 30. The stack, device, or method of items 27-29, wherein a polymer of the polymer matrix includes a transparent polymer.

Item 31. The stack, device, or method of any one of items 27-30, wherein a polymer of the polymer matrix includes a PVT, a PS, a PMMA, an epoxy, a polyvinylcarbazole (PVK), a polybutyrate (such as cellulose acetate butyrate), a polycarbonate, a polyurethane, a glycol modified polyethylene terphthalate (PETG), or any combination thereof.

Item 32. The stack, device, or method of item 27 or 30, wherein the polymer is sensitive to gamma rays.

Item 33. The stack, device, or method of items 32, wherein the particulate material includes lead, bismuth, or any combination thereof.

Item 34. The stack, device, or method of any one of the preceding items, wherein the scintillator stack includes a neutron-sensitive layer, and the neutron-sensitive layer has a thickness of no greater than 100 microns, no greater than 50 microns, no greater than 25 microns, no greater than 15 microns, or no greater than 9 microns.

Item 35. The stack, device, or method of any one of the preceding items, wherein the scintillator stack includes a neutron-sensitive layer, and the neutron-sensitive layer have a thickness of at least 1 micron, at least 2 microns, at least 3 microns, at least 4 microns, or at least 5 microns.

Item 36. The stack, device, or method of any one of the preceding items, wherein the scintillator stack includes a neutron-sensitive layer, and the neutron-sensitive layer has a thickness of 1 to 100 microns, 3 to 25 microns, 3 to 15 microns, or 3 to 9 microns.

Item 37. The stack, device, or method of any one of the preceding items, wherein the scintillator layer is not a neutron-sensitive layer, and the scintillator layer has a thickness of no greater than 100 microns, no greater than 85 microns, no greater than 55 microns, no greater than 45 microns, or no greater than 35 microns.

Item 38. The stack, device, or method of any one of the preceding items, wherein the scintillator layer is not a neutron-sensitive layer, and the scintillator layer has a thickness of at least 5 microns, at least 15 microns, or at least 25 microns.

Item 39. The stack, device, or method of any one of the preceding items, wherein the scintillator layer is not a neutron-sensitive layer, and the scintillator layer has a thickness of 5 to 100 microns, 15 to 55 microns, or 25 to 45 microns.

Item 40. The stack, device, or method of any one of the preceding items, wherein the light-transportation layer comprises a polymer.

Item 41. The stack, device, or method of item 40, wherein the light-transportation layer comprises a PS, a PVT, a polyethylene naphthalate (PEN), a polyethylene terephthalate (PET), or any combination thereof.

Item 42. The stack, device, or method of any one of the preceding items, wherein the light-transportation layer is a light guide, a wavelength shifter, a neutron moderator, or any combination thereof.

Item 43. The stack, device, or method of any one of the preceding items, wherein the light-transportation layer has a refractive index that is greater than a refractive index of the scintillator layer.

Item 44. The stack, device, or method of any one of the preceding items, wherein the light-transportation layer has a thickness of no greater than 135 microns, no greater than 125 microns, no greater than 115 microns, or no greater than 95 microns.

Item 45. The stack, device, or method of any one of the preceding items, wherein the light-transportation layer has a thickness of at least 0.09 micron, at least 0.3 micron, at least 0.5 micron, at least 0.7 micron, or at least 0.9 micron.

Item 46. The stack, device, or method of any one of the preceding items, wherein the light-transportation layer has a thickness of 3 to 135 microns, 5 to 95 microns, or 7 to 15 microns.

Item 47. The stack, device, or method of any one of the preceding items, wherein the ratio by weight of particulate material:polymer in the scintillator layer is at least 0.85:1, at least 0.90:1, or at least 0.95:1.

Item 48. The stack, device, or method of any one of the preceding items, wherein the ratio by weight of particulate material:polymer in the scintillator layer is no greater than 1.25:1, no greater than 1.15:1, or no greater than 1.05:1.

Item 49. The stack, device, or method of any one of the preceding items, wherein the ratio by weight of particulate material:polymer in the scintillator layer is from 0.85:1 to 1.24:1, from 0.90:1 to 1.15:1, or from 0.95:1 to 1.05:1.

Item 50. The stack, device, or method of any one of the preceding items, wherein the stack includes at least 5 of each layer, at least 15 of each layer, at least 25 of each layer, at least 35 of each layer, or at least 45 of each layer.

Item 51. The stack, device, or method of any one of the preceding items, wherein the stack includes no greater than 10,000 of each layer, no greater than 5,000 of each layer, no greater than 1,000 of each layer, no greater than 85 of each layer, or no greater than 65 of each layer.

Item 52. The stack, device, or method of any one of the preceding items, wherein the stack includes from 5 to 100 of each layer, from 15 to 85 of each layer, or from 25 to 65 of each layer.

Item 53. The stack, device, or method of any one of the preceding items, wherein the stack has a thickness of at least 1 mm, at least 1.5 mm, at least 2 mm, or at least 2.5 mm Item 54. The stack, device, or method of any one of the preceding items, wherein the stack has a thickness of no greater than 5 mm, no greater than 4.5 mm, or no greater than 3.5 mm.

Item 55. The stack, device, or method of any one of the preceding items, wherein the stack has a thickness of 1 to 5 mm, 1.5 to 4.5 mm, or 2 to 3.5 mm.

Item 56. The stack, device, or method of any one of the preceding items, wherein the stack has a percent trapped light of greater than 13%, at least 13.3%, at least 13.5%, or at least 13.7%.

Item 57. The stack, device, or method of any one of the preceding items, wherein the stack has a brightness product of at least 3.8, at least 4, at least 5, at least 7, at least 9, at least 11, or at least 13.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A scintillator stack comprising:
   an at least one scintillator layer including a first scintillator layer;
   an at least one neutron sensitive layer including a first neutron-sensitive layer;

a first light-transportation layer; and
a second light-transportation layer,
wherein the first scintillator layer and the first neutron-sensitive layer are disposed between and directly contacting the first and second light-transportation layers;
wherein the first scintillator layer directly contacts the first neutron-sensitive layer; and
wherein the at least one scintillator layer and the at least one neutron-sensitive layer each have an averaged thickness of less than 100 microns.

2. The scintillator stack of claim 1, wherein the at least one neutron-sensitive layer includes a neutron-sensitive particulate material dispersed in pulse shape discriminating (PSD) polymer.

3. The scintillator stack of claim 1, wherein the at least one scintillator layer is gamma ray-sensitive.

4. The scintillator stack of claim 3, wherein the at least one scintillator layer includes a particulate material dispersed in a polymer matrix.

5. The scintillator stack of claim 4, wherein the particulate material is sensitive to gamma rays.

6. The scintillator stack of claim 5, wherein the particulate material includes NaI, $CeBr_3$, bismuth germinate (BGO), or any combination thereof.

7. The scintillator stack of claim 4, wherein the polymer is sensitive to gamma rays.

8. The scintillator stack of claim 1, wherein the at least one scintillator layer includes a scintillator particulate material; and
the at least one neutron-sensitive layer includes a neutron-sensitive particulate material.

9. The scintillator stack of claim 8, wherein the stack includes a plurality of alternating layers including the at least one scintillator layer, the first light-transportation layer, the second light transportation layer and the at least one neutron-sensitive layer.

10. The scintillator stack of claim 8, wherein the at least one scintillator layer is an organic scintillator layer.

11. The scintillator stack of claim 1, wherein the at least one scintillator layer is not a neutron-sensitive layer.

12. The scintillator stack of claim 1, wherein the stack includes at least 5 layers of each of the at least one scintillator layer, the light transportation layer and the at least one neutron sensitive layer.

13. The scintillator stack of claim 1, wherein the stack has a thickness of at least 1 mm.

14. The scintillator stack of claim 1, wherein the stack has a percent trapped light of greater than 13%.

15. The scintillator stack of claim 1, wherein the stack has a brightness product of at least 3.8.

16. A method of making the scintillator stack of claim 1, the method comprising:
providing an extrudable scintillator material;
providing an extrudable light-transportation material;
co-extruding a structure comprising:
the at least one scintillator layer; and
the first and the second light-transportation layers; and
providing the structure to at least one multiplier extrusion die.

17. The method of claim 16, wherein a total number of the at least one neutron-sensitive layers and the total number of the at least one scintillator layers is equal to $2^{x+1}$, where x is a number of multiplier extrusion dies.

18. The scintillator stack of claim 16, further comprising providing an extrudable neutron-sensitive material, wherein the structure further comprises the at least one neutron-sensitive layer.

19. The scintillator stack of claim 1, wherein the stack includes a plurality of alternating layers including the at least one scintillator layer, the first light-transportation layer, the first light-transportation layer, and the at least one neutron-sensitive layer.

* * * * *